US008024297B2

(12) United States Patent
Gladkov et al.

(10) Patent No.: US 8,024,297 B2
(45) Date of Patent: Sep. 20, 2011

(54) DATA LOGGING SYSTEM AND METHOD THEREOF FOR HETEROGENEOUS DATA

(75) Inventors: Vladimir Gladkov, Taipei Hsien (TW); Dmitry Slepov, Taipei (TW)

(73) Assignee: Tibbo Technology, Inc., Taipei (TW)

(*) Notice: Subject to any disclaimer, the term of this patent is extended or adjusted under 35 U.S.C. 154(b) by 370 days.

(21) Appl. No.: 12/180,225

(22) Filed: Jul. 25, 2008

(65) Prior Publication Data

US 2010/0023545 A1 Jan. 28, 2010

(51) Int. Cl.
*G06F 7/00* (2006.01)
*G06F 17/30* (2006.01)

(52) U.S. Cl. ......... 707/648; 707/661; 707/672; 707/682

(58) Field of Classification Search .................. 707/648, 707/672, 682, 661, 999.102
See application file for complete search history.

(56) References Cited

U.S. PATENT DOCUMENTS

| | | | | |
|---|---|---|---|---|
| 5,907,848 | A * | 5/1999 | Zaiken et al. | 705/4 |
| 7,031,981 | B1 * | 4/2006 | DeLuca et al. | 707/999.104 |
| 7,743,029 | B2 * | 6/2010 | Frey et al. | 707/648 |
| 2003/0208464 | A1 * | 11/2003 | Lee et al. | 707/1 |
| 2006/0020616 | A1 * | 1/2006 | Hardy et al. | 707/101 |
| 2006/0136189 | A1 * | 6/2006 | Maturana et al. | 703/17 |
| 2006/0184529 | A1 * | 8/2006 | Berg et al. | 707/8 |
| 2006/0235878 | A1 * | 10/2006 | Shipp et al. | 707/104.1 |
| 2009/0113076 | A1 * | 4/2009 | Long | 709/248 |

OTHER PUBLICATIONS

IBM, "System and method for efficient search and retrieval of log file records for hierarchical data", IPCOM, Mar. 2006, pp. 1-6. Download: http://ip.com/pdf/ipcompad/IPCOM000134924D.pdf?free=priorartdatabase.*

* cited by examiner

*Primary Examiner* — Hares Jami
(74) *Attorney, Agent, or Firm* — Morris Manning Martin LLP; Tim Tingkang Xia, Esq.

(57) ABSTRACT

The present invention provides a data logging system and a data logging method for heterogeneous data. The record file and the index file according to the present invention are constructed in such a way that the data from the log record corresponding to a given target visual data line are accessible within essentially constant time independent of the position of the visual data line within the data view, the size of the data view, the size of the log record, and the size of the record file. In the present invention, the interpreted data for each log record, occupying zero or at least one of the visual data lines, are represented within the data view continuously side by side. The computer readable medium having recorded thereon a program allowing a computer to execute the data logging method according to the present invention and the computer program product for the same are also provided.

10 Claims, 5 Drawing Sheets

DATA LOGGING SYSTEM AND METHOD THEREOF FOR HETEROGENEOUS DATA

FIELD OF THE INVENTION

This invention relates generally to data logging systems, and more particularly, to an improved data logging system that can efficiently record and represent heterogeneous data including text messages, binary data in its hexadecimal and ASCII representation, graphical information, and other types of data.

BACKGROUND OF THE INVENTION

Data logs and data logging systems are widely used in the computing industry. Data logging is a process of automatically recording certain events in order to provide an audit trail of the activities in a specific part of the computer system. Logging is also one of the oldest and still one of the most widely used techniques for troubleshooting computer systems.

For example, a logging system designed to log and analyze network traffic captured by a so-called network sniffer may show important statistics and contents for each network packet captured by the sniffer.

A typical logging system is shown on FIG. 1. The logging system 10 characteristically comprises a data structure 11 that receives log records being logged from the external data source 9, and a log viewing facility 12 that visually presents logged data.

Actual programming implementation of the logging system 10 can take many shapes and forms. Components of the logging system may be implemented as independent software modules or may be combined with each other. However, the logging system 10 is implemented with hardware. For example, the data structure 11 can physically reside in a computer RAM or be implemented as a file on a disk. Log viewing facility 12 may comprise a simple terminal output or be presented in a scrollable program window or multiple windows.

Regardless of how the log viewing facility 12 is organized, the representation of the log records typically comprises a sequence of visual data lines. Each visual data line may consist of textual and graphical information. Combined together, all visual data lines form what will herein be referred to as a log view. The log view should not be confused with the log viewing facility. The former one is a hypothetical concept that represents all visual data lines corresponding to all existing log records, the latter—technical means for viewing a portion of the log view. As a logical construct, the log view may not have an actual physical implementation or image in the computer memory. Instead, as the log viewing facility "slides" along the log view, the logging system may be reconstructing visual data lines that become visible.

Certain logging systems must deal with heterogeneous log records. For example, in the logging system for network traffic, it may be necessary to log textual messages such as "TCP session established" and "TCP session terminated", as well as log actual contents of the data being exchanged in the cause of the TCP session. Textual messages and actual data are, in fact, log records of two different types and this makes the network traffic logging system a heterogeneous logging system.

Requirements for the visual representation of different types of log records in a heterogeneous logging system may differ depending on the record type. For example, a simple message record such as "TCP session established" may be presented as text string occupying a single visual data line, while a record containing a portion of an actual binary data exchanged in this TCP session may need to occupy several visual data lines and contain both the hexadecimal and ASCII representation of the binary data.

There are two main approaches to representing logged data in the data view facility 12 of heterogeneous logging system.

The first approach is to convert heterogeneous log records into a homogeneous textual data. As a result, the data view facility 12 only needs to display a simple and homogeneous text file. An example of such textual output is shown on FIG. 2. Textual output 20 consists of messages 21 and blocks of data 22. It can be said that the logging system has records of two types—messages 21, and data blocks 22. Records of both types can interleave each other. Typically, the data block 22 consists of at least two areas: the area 23 showing the hexadecimal (HEX) representation of data, and the area 24 showing the ASCII representation of data. Traditionally, each visual line of such outputs reflects the value of 16 bytes of data.

This traditional approach is easy in the implementation and has been used in many popular logging systems, such as the TCPDUMP program for capturing network traffic.

At the same time, this simple approach has a significant disadvantage. After all types of records have been converted into their textual representation, each record effectively loses its boundaries and identity, thus becoming a simple block of text. Therefore, it becomes impossible to perform certain operations pertaining only to specific record types.

For example, it may be impossible to perform a search for all occurrences of a substring in the data exchanged in the TCP session. Substring 25 may be split between two lines of text and this will make it impossible to find this substring occurrence.

The second popular approach preserves each log record intact. All log records continue their existence independently and the logging system can identify each record separately and perform operations pertaining only to records of specific types.

In the known systems, however, this approach leads to a significant limitation in the way the data is presented in the data viewing facility. In known systems, such as the WireShark network protocol analyzer, each log record in the data viewing facility is accorded a single visual data line regardless of the type and contents of this record.

This single-line representation works well for simple message records, but does not allow directly showing blocks of data which require multiple visual data lines. As a result, the actual contents of the records of certain types are displayed in a separate area of the data viewing facility, with the obvious result that only the contents of a single such record can be visible at any given time. An example of such output is shown on FIG. 3.

The output 30 consists of two areas 31 and 32. The area 31 displays a list of logged records. Contents of the log records of certain types are displayed directly within the area 31. F or other types of records, such as the records containing a block of data, the contents are displayed in a separate area 32. The area 32 always presents the contents of a single log record 33 selected in the main list shown in the area 31.

With the division into records and record structure preserved, the logging systems of the second type can easily perform operations pertaining only to specific record types. For example, it becomes possible to perform substring searches in binary data—an operation which is impossible in the logging systems using the first approach.

Significant disadvantage that will be immediately obvious to those skilled in the art is the impossibility of viewing the contents of more than one log record at any given time. One of the reasons for choosing this approach may be the difficulty of implementing efficient scrolling in the data viewing facility of the logging system that allocates a variable number of visual data lines for each log record in accordance with the type and the amount of data in each such record.

SUMMARY OF THE INVENTION

In view of the above, it is an object of the present invention to create an improved data logging system that is capable of working with heterogeneous log records, preserves the properties of each such record, and includes a data viewing facility that is capable of displaying full contents of all data records continuously, side by side, and in different representations, with the representation for each record type selected to best suit the records of this type, and occupying any required number of visual data lines.

It is another object of the present invention to provide an efficient mechanism for navigating through visual data lines, where such mechanism is capable of locating any target visual data line within a period of time that is independent of the total log size and relative positions of the current and target visual data lines.

The improved logging system according to the preferred embodiment of the present invention comprises a heterogeneous data viewing facility, underlying data structure that stores logged data as log records of different types, and a necessary number of data controllers, each controller being responsible for working with log records of specific type.

The data controllers generate visual representations of log records. Each data controller is responsible for processing log records of one specific type. The data controller for each log record type generates visual log record representations in a format which is best suited for viewing the contents of the log records of this type. Depending on a particular log record type, the visual representation may occupy a single or multiple visual data lines in the log viewing facility.

In the preferred embodiment of the present invention, improved scrolling along the data view is achieved by maintaining a special index file that binds each visual data line in the log view to its corresponding log record. By taking desired visual data line number and querying it against the index file, the logging system can instantly locate the corresponding log record and position of the given visual data line within this log record.

Maintaining described index file provides an efficient way of navigating the log but can result in very large index files. In the alternative embodiment of the present invention, the size of the index file is reduced by storing the indexing data not for each visual data line, but for each Nth visual data line, where the value of N is referred to as the index resolution and where such resolution is selected in accordance with the desired balance between the size of the index file and required performance of the logging system.

Since the index file according to the alternative embodiment of the present invention does not contain an entry for every visual data line, the logging system may need to perform a number of additional operations aimed at locating the log record corresponding to this visual data line. The amount of such additional operations, however, is limited by the value of N. Given large sizes of many logs, it is possible to select the value of N that reduces the size of the index file by an order of magnitude while only slightly decreasing the performance of the logging system.

Other objects, features and advantages of the present invention will be apparent from the following detailed description taken in connection with the accompanying drawings, wherein:

DETAILED DESCRIPTION OF THE PREFERRED EMBODIMENT

In the following detailed description, reference is made to the accompanying drawings that form a part thereof, and in which are shown by way of illustration, specific embodiments in which the invention may be practiced.

The embodiments of the present invention are described in sufficient detail to enable those skilled in the art to practice the invention, and it is to be understood that other embodiments may be utilized. It is also to be understood that changes can be made without departing from the spirit and scope of the present invention. The following detailed description, therefore, is not to be taken in the limiting manner, and the scope of the present invention is defined by the following claims and their equivalents.

Figure 1:
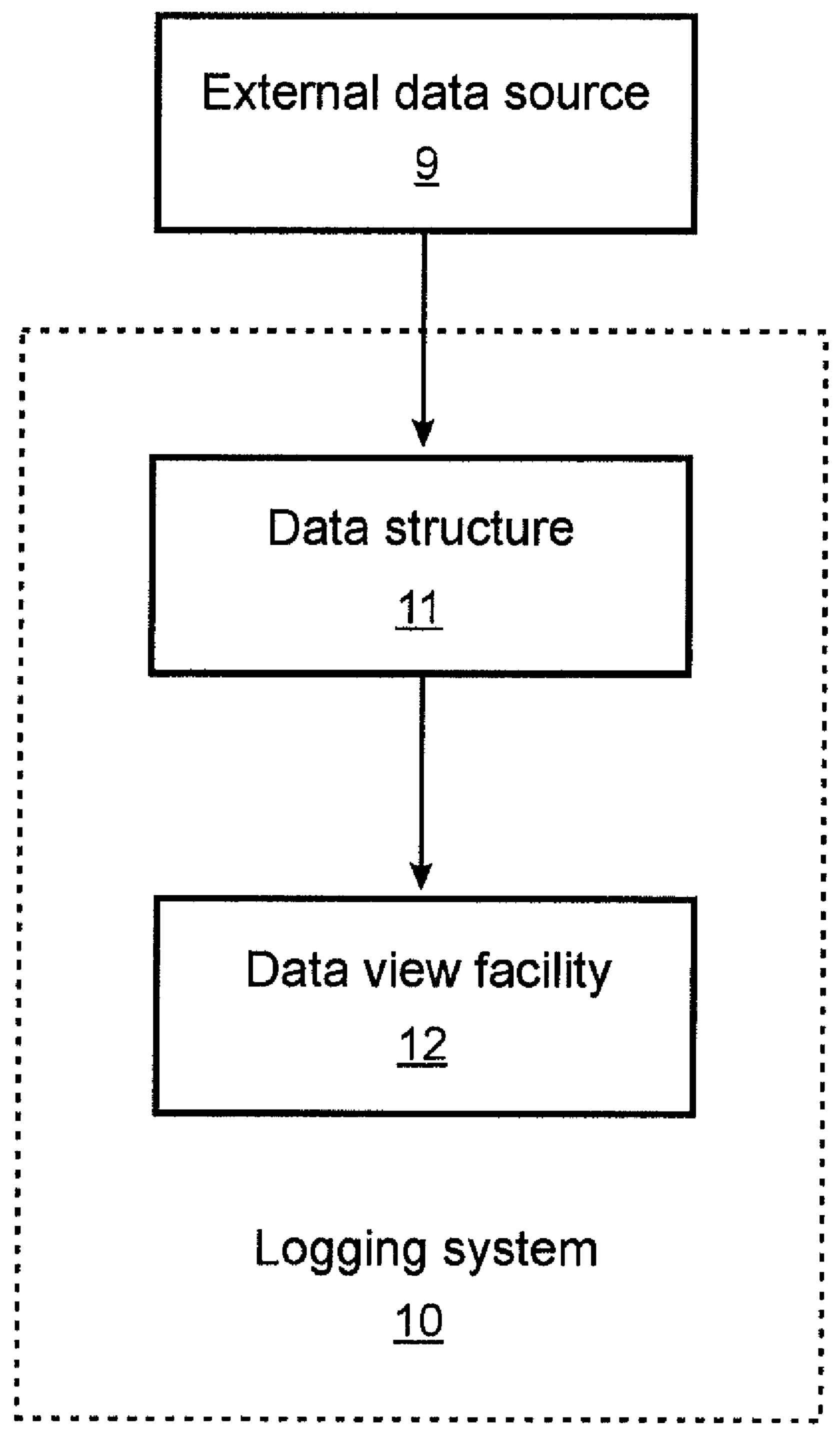
FIG. 1 shows a block diagram of a traditional data logging system according to the prior art.
Figure 2:
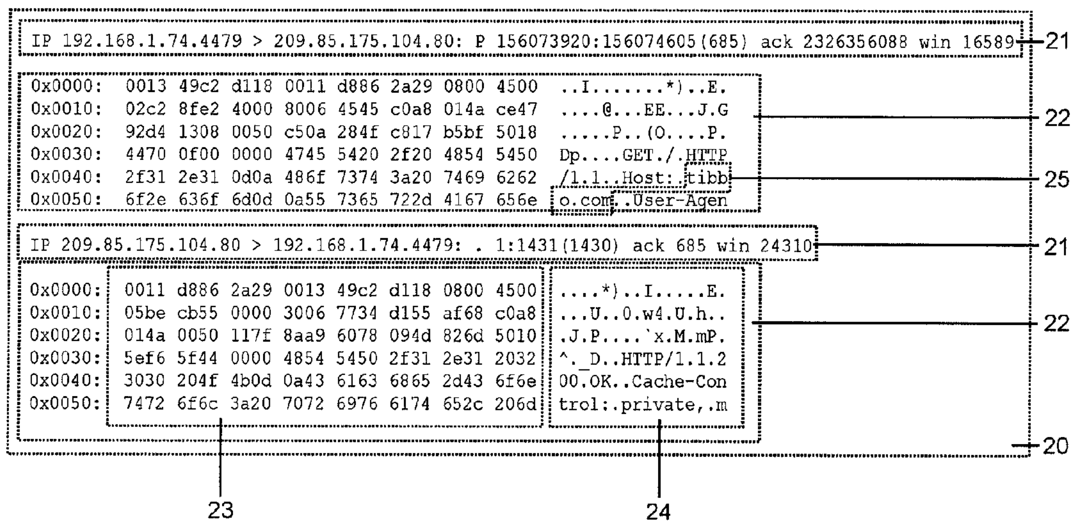
FIG. 2 shows a visual output of the traditional data logging system of the first type according to the prior art, where heterogeneous log records are converted into a homogeneous textual representation.
Figure 3:
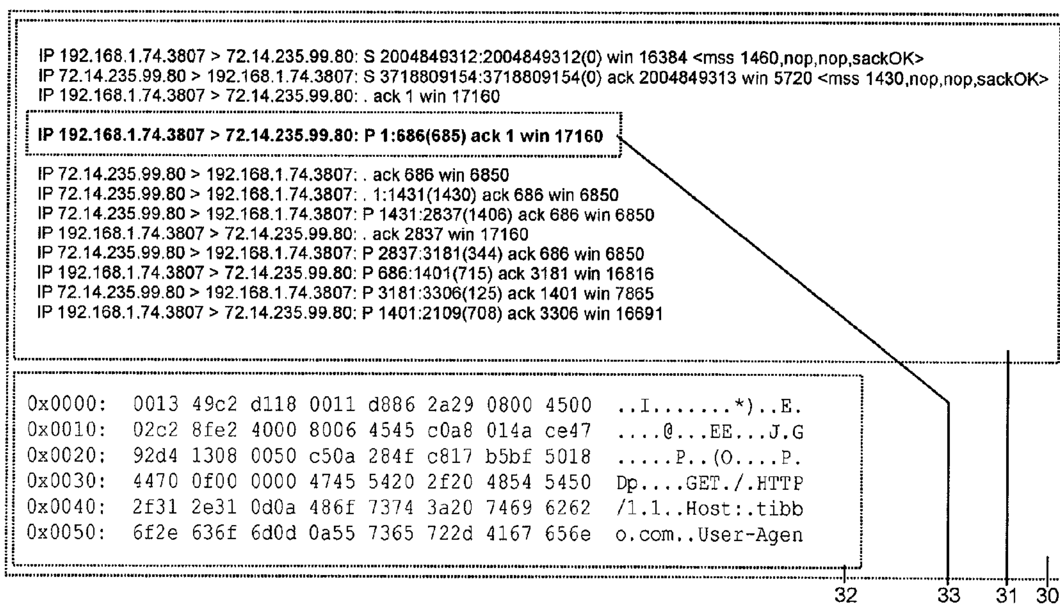
FIG. 3 shows a visual output of the traditional data logging system of the second type according to the prior art, where the log viewing facility has two areas—one area for displaying the log records and another area for displaying the contents of one selected log record.
Figure 4:
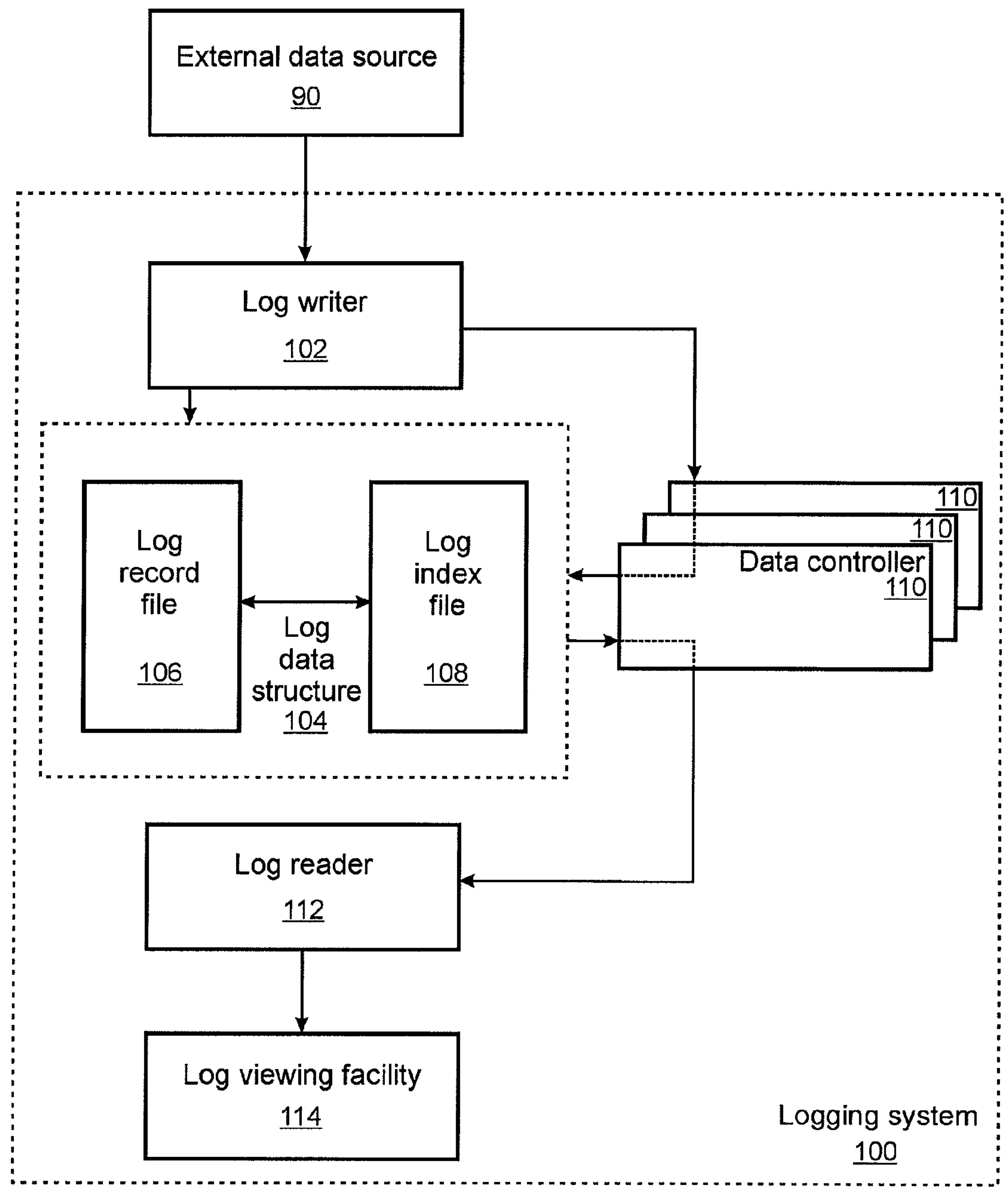
FIG. 4 shows the block diagram of the improved logging system according to a preferred embodiment of the present invention.

Referring particularly to FIG. 4, there shown a block diagram of the improved logging system according to the preferred embodiment of the present invention.

A logging system 100 records log events generated by external event source 90. Recording of the log events is implemented with hardware such as a computer. The logging system 100 comprises log data structure 104, log writer software module 102, log reader software module 112, log viewing facility 114, and a number of data controllers 110. Log data structure 104 includes log record file 106 and log index file 108. Each of the components or software modules is implemented with hardware such a computer.

Log writer module 102 appends each new log record to the log record file 106 and also updates the log index file 108 by utilizing one of the data controllers 110. Which data controller 110 is used to update the log index file 108 during the appending of a new log record depends on this record's type.

Log reader module 112 fetches the data from the log record file 106 and uses the index record file 108 in conjunction with data controllers 110 for efficient navigation within the contents of the log record file 106. The log reader 112, in combination with data controllers 110, also generates visual data lines to be displayed in the log viewing facility 114.

The logging system of the present invention is able to work with heterogeneous log records of arbitrary nature and multiple data controllers 110 may exist in the logging system to process the log records of different types. For the sake of clarity, the following explanation will herein refer to the record of just two exemplary types.

The first exemplary type of data controller will herein be referred to as type A. Type A data controller is for handling text messages. Controller of type A reconstructs a readable message, for example "TCP connection established with remote node at google.com:80". F or type A data controller, the message will always occupy a single visual data line. Optionally, the data controller of this type can also provide additional user interface features such as text highlighting using different colors, displaying icons within the visual data line, or representing a part of the text message as a hyperlink.

The second exemplary type of data controller will herein be referred to as type B. Type B data controller is for handling hexadecimal (HEX) and ASCII representation of binary data. For example, type B controller can be used to represent the contents of network packets in a way traditionally used by HEX viewers or editors. The data representation produced by the type B controller may occupy multiple visual data lines. Optionally, the data controller of this type can also provide additional user interface features such as text highlighting using different colors, or displaying icons.

It should be noted and understood that the above two types of log records and corresponding controllers are provided solely as an example of varying data representation requirements typically encountered within one data logging system and should not be construed as limiting the scope of the present patent in any way.

It should also be noted and understood that various software modules shown on FIG. 4, namely, the log writer 102, data controllers 110, log reader 112, and log viewing facility 114, reflect the general operation and functionality of the improved logging system and are not meant to codify actual interdependencies between, or grouping of the software modules of the logging system built in accordance with the preferred embodiment of the present invention. Each of the software modules 102, 110, 112, and 114 can, in practice, comprise one or more functions and is implemented with hardware such a computer. Moreover, the grouping of a certain function under the umbrella of a particular software module shown on FIG. 4 represents a point of view aimed at making a clear explanation of the inner workings of the improved logging system. Other points of view are possible, and may result in a different block diagram, which, nevertheless, will represent essentially the same improved logging system.

For example, FIG. 4 shows each data controller 110 as an independent software module. Data controllers 110 are used both by the log writer 102 and the log reader 112. In practice, each data controller 110 may be implemented as a library consisting of two functions—one used by the log writer 102, and another one used by the log reader 112. It is possible then, to logically group the first function of each data controller 110 with the log writer 102, and the second function of each data controller 110—with the log reader 112. Such logical grouping would result in the disappearance of the data controllers 110 from FIG. 4. The essence of the logging system operation, meanwhile, would have remained the same—the system would still have several sets of functions, which each set designed to work with a specific type of log records.

Figure 5:
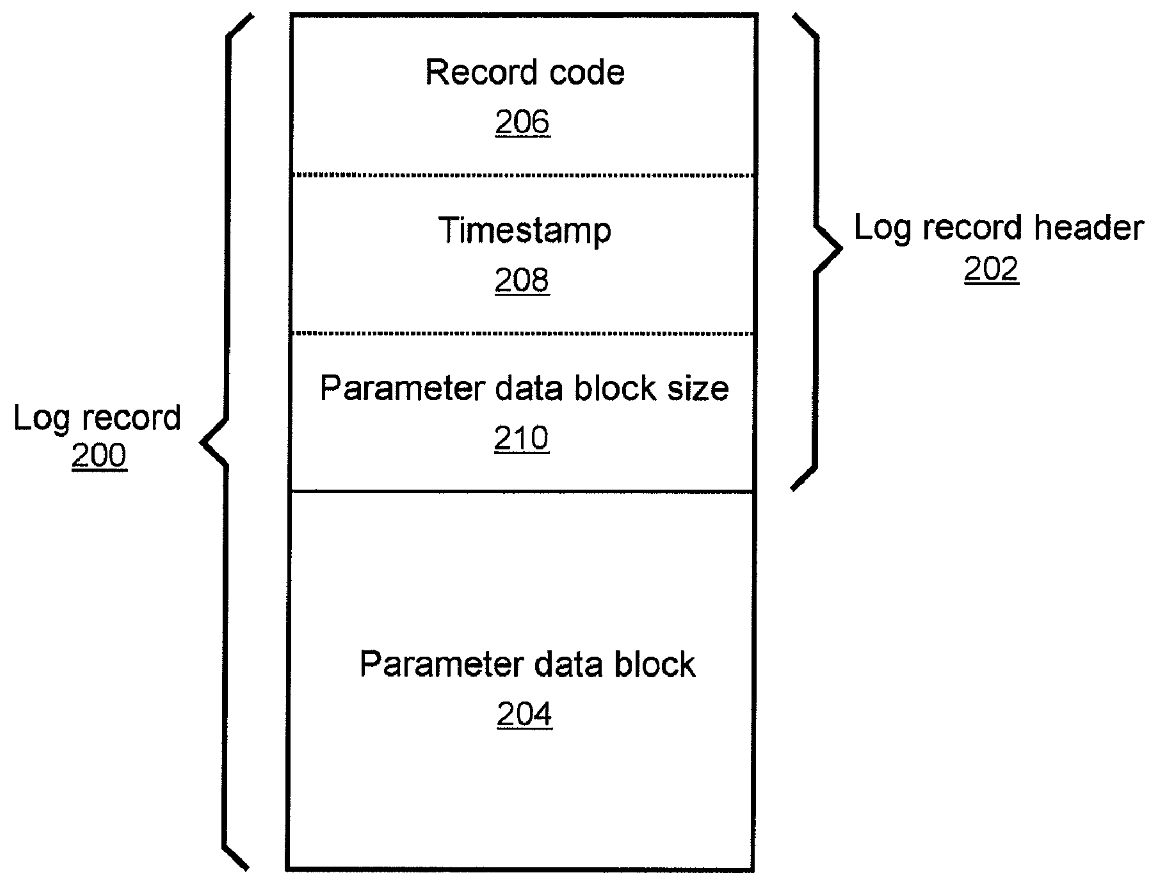
FIG. 5 shows the structure of one log record according to a preferred embodiment of the present invention.

Referring particularly to FIG. 5, there shown a structure of one log record 200 of the log record file. Each log record 200 contains a log record header 202, and an optional parameter data block 204. Log record header 202 contains a record code 206, timestamp 208, and parameter data block size field 210.

Record code 206 is the field used to choose one of the data controllers that corresponds to a particular log record type.

Timestamp 208 holds the date and time on which this particular log record was generated. Although the timestamp 208 is usually required for most data logging activities, it does not constitute an essential part of the present invention and may be omitted.

Parameter data block 204 holds additional information relevant to a record of specific type. For example, parameter data block 204 for "TCP connection established" message would contain the IP address and port of remote node with which this TCP connection has been established. Parameter data block 204 for transmitted or received packet data would contain actual contents of the packet. Parameter data block 204 can be of any size, including zero.

Because of the variable size of the parameter block 204, log records 200 may vary in size. It is also noteworthy that the format of log records 200 is independent of the data controller set used in a particular logging system. The same log file can be interpreted using a different set of data controllers if so required.

Figure 6:
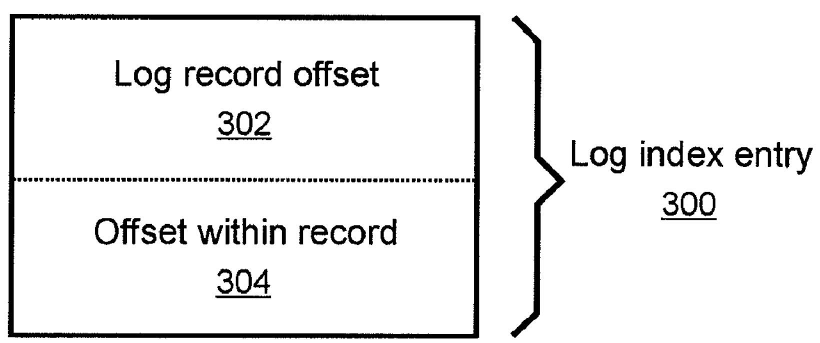
FIG. 6 shows the structure of one log index entry according to a preferred embodiment of the present invention.

Referring now to FIG. 6, there shown a structure of one log index entry 300 of the log index file. Each log index entry 300 relates to a specific visual data line number within the log view and gives complete information on the log record corresponding to the given visual data line number.

All log index entries 300 have the same size and contain two fields—log record offset field 302 and offset within record field 304. The side of each log entry 300 in bytes is implementation dependent. In the preferred embodiment of the present invention each of the two fields comprises 32-bit values. Therefore, each index entry 300 occupies eight bytes. Alternative embodiments of the logging system can utilize the fields of different size, for example, 64-bit fields. Specific size of the fields 302 and 304 is immaterial to the essence of the present invention.

The log record offset field 302 stores the offset of the log record within the log record file with respect to the beginning of this file. To locate the log record corresponding to a given visual data line number, one only has to calculate an offset address within the index file, proportional to the visual data line number, and take the contents of the log record offset field 302 of the index entry located at this address.

Remembering now that the visual representation of a single log record can occupy multiple visual data lines, it becomes obvious that multiple index entries may point at the same log record. Thus, the second field of the index entry—the offset within record field 304—additionally specifies the offset, with respect to the beginning of the parameter data block 204 (of FIG. 5), of the log record data related to a particular visual data line.

It should be noted and understood that the offset within record field 304 is specific to a particular record type. Depending on the record type, this field may be left unused, may comprise an offset within the log record, or represent any other form of data used by a corresponding data controller for locating, within the log data record, of information pertaining to a given visual data line. All such variations are within the spirit and scope of the present invention.

Figure 7:
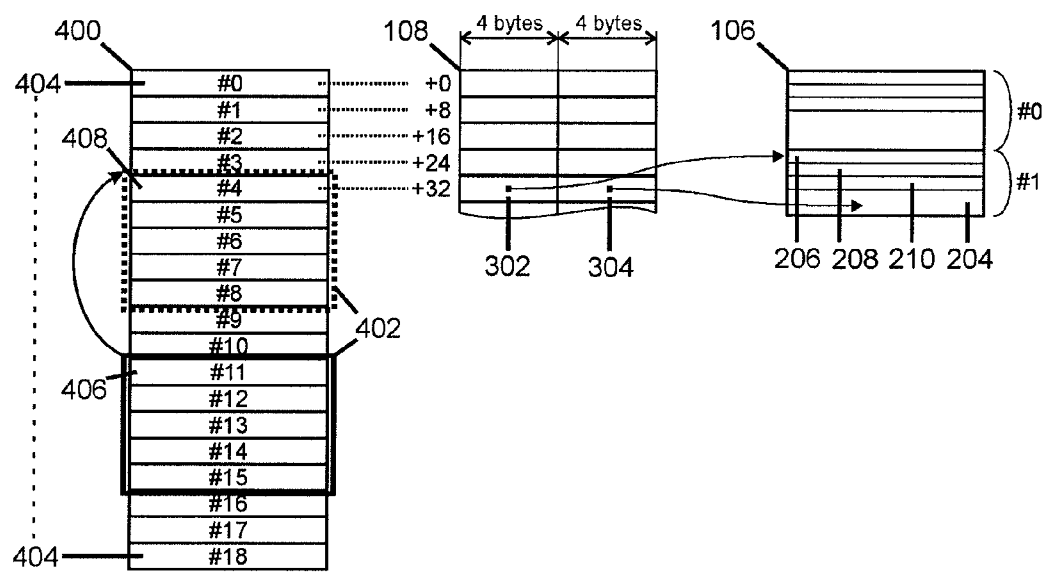
FIG. 7 schematically illustrates the relation between the visual data lines, log records of the log record file, and log index entries of the log index file.

FIG. 7 additionally illustrates the relation between the visual data lines, log records of the log record file, and log index entries of the log index file.

A combination of all visual data lines 404 representing all log records from the log record file 106 forms a continuous log view 400. Each visual data line in the log view 400 can be referred to by its number, counting from zero. The log viewing facility 402 is represented as a sliding window that shows a portion of the log view 400. The log view 400 is a logical construct that does not have any actual physical representation. As the log viewing facility 402 slides along the log view 400, the logging system reconstructs visual data lines 404 that must be displayed within the log viewing facility 402.

Let's suppose now that the position of the log viewing facility 402 has been changed from the original position 406 to the new position 408. The logging system must now reconstruct a number of visual data lines 404 starting from the line at position 408. As an example, let's assume that this is a visual data line #4.

To achieve this, the logging system first takes the number of the target visual data line—#4 in the current example—and multiplies it by the size of one log index entry of the log index file 108. In the improved logging system according to the preferred embodiment of the present invention, this size is equal to 8 bytes. Resulting value—32—is the target byte offset within the log index file 108.

The logging system then reads the log index entry located at offset 32 of the log index file 108. Let's suppose that the log record offset field 302 of this log index entry tells the logging system that the visual data line #4 is related to the log record #1 of the log record file 106. Then, by reading the contents of the offset within record field 304 the logging system can determine what portion of the parameter data block 204 of the log record #1 corresponds to the visual data line #4.

The process is then repeated for all other visual data lines that have to be displayed by the data viewing facility 402.

Discussing now the log writer software module 102 (of FIG. 4) the latter accepts the following input parameters:

log_record_code;

timestamp;

log_record_parameter_data_block;

log_record_parameter_data_block_size.

The log writer software module 102 has the following algorithm of operation:

Step 1: generate log record header 202 with fields 206, 208, and 210 (of FIG. 5) constructed from the input parameters.

Step 2: append complete log record header 202 and parameter data block 204 to the log record file and memorize the offset of the newly appended record with respect to the beginning of the log record file. This offset will herein be referred to as Y.

Step 3: based on the record code field 206 select an appropriate data controller.

Step 4: update the log index file using selected data controller. This is a controller-dependent procedure.

The procedure of updating the log index file for log records of type A is as follows:

Step 1: generate new index entry with log record offset field 302 (of FIG. 6) containing the offset Y, and offset within record field 304 left blank.

Step 2: append new index entry to the log index file.

The procedure of updating the log index file for log records of type B is as follows:

Step 1: assume X=0.

Step 2: while (X<log_record_parameter_block_size)

Step 3: generate new index entry with log record offset field 302 containing the offset Y, and offset within record field 304 equal to X.

Step 4: append new index entry to the log index file.

Step 5: calculate X=X+16 (the value of 16 is selected assuming that 16 bytes of data are represented on each visual data line).

Step 6: end of while cycle.

As a result of the above algorithms operation, new log record is added to the log record file and the log index file is updated accordingly.

Discussing now the log reader software module 112 (of FIG. 4) the latter accepts the following input parameters:

first_visual_data_line_to_read;

number_of visual_data_lines_to_read.

The log reader software module 112 has the following algorithm of operation:

Step 1: find and fetch the log index entry that corresponds to the given first_visual_data_line_to_read. Since all log index entries are of the same size, finding of the record is achieved by multiplying the first_visual_data_line_to_read parameter by the size of the log index entry.

Step 2: take the log record offset 302 (of FIG. 6) of the log index entry fetched in step 1 and use the contents of this field to locate the corresponding log record in the log record file and fetch its record code field 206 (of FIG. 5).

Step 3: based on the contents of the record code field 206, select an appropriate data controller.

Step 4: assume I=first_visual_data_line_to_read parameter.

Step 5: assume J=number_of visual_data_lines_to_read parameter.

Step 6: Using selected data controller, generate visual data lines containing the representation of this log record. This is a controller-dependent procedure.

Step 7: while (J>0).

Step 8: fetch next log record code field 206 from the log record file.

Step 9: based on the contents of the record code field 206, select an appropriate data controller.

Step 10: using selected data controller, generate visual data lines containing the representation of this log record. This is a controller-dependent procedure.

Step 11: end of while cycle.

The procedure of generating visual data lines at step 6 and step 11 for log records of type A is as follows:

Step 1: fetch the log record including the header 202 and parameter data block 204.

Step 2: use the record code field 206 and parameter data block 204 to reconstruct the text message, for example "TCP connection established with remote node google.com:80".

Step 3: fill visual data line I with message generated in step 2 of the current algorithm.

Step 4: calculate I=I+1.

Step 5: calculate J=J−1.

The procedure of generating visual data lines at step 6 and step 11 for log records of type B is as follows:

Step 1: assume K=offset within record field 304 (of FIG. 6) when the procedure is called from the step 6 of the log reader module algorithm. Assume K=0 when the procedure is called from the step 11 of the log reader module algorithm.

Step 2: read the log record header 202 (of FIG. 5).

Step 3: calculate X=min (J*16, record parameter data block size field 210−K).

Step 4: skip K bytes in the log record file.

Step 5: read X bytes from the log record file.

Step 6: calculate N=X/16.

Step 7: fill N visual data lines starting with I with HEX and ASCII representation of X bytes read on step 5.

Step 8: calculate I=I+N.

Step 9: calculate J=J−N.

In the alternative embodiment of the present invention, the log index entries are not added for each visual data line. In the alternative embodiment of the present invention, such index entries are instead for each Nth visual data line.

In the alternative embodiment of the present invention, the structure of the log record file 106 (of FIG. 4) and the structure of log index entries of the log index file 108 remain exactly the same as in the preferred embodiment of the present invention.

In the alternative embodiment of the present invention, the structure of the log index file 108 is modified to include an additional field that holds the total number of visual data lines occupied by the combined visual representation of all log records of the log record file 106.

The log writer software module 102 updates this additional field each time a new log record is added to the log record file 106. New index entry, however, is created only for each Nth visual line. Therefore, the total size of the log index file 108 is reduced N times.

When the log reader software module 112 queries the log index file 108 to find the log index entry corresponding to the first requested visual data line to create, there is no guarantee that the index entry for precisely this line number exists. The log reader module 112 will instead find the log index entry for the closest line having the line number less or equal to the desired line number. The log reader module 112 will then start fetching the log record data starting with this line.

It will be obvious to those skilled in the art that the logging system according to the alternative embodiment of the present invention introduces certain overhead caused by the fact that only each Nth visual data line is referenced by the log index file 108. With sensibly selected parameter N, however, this overhead will be insignificant, while the reduction in the log index file 108 size will be quite substantial.

The present invention also relates to apparatus for performing the operations herein. This apparatus may be specially constructed for the required purposes, or it may comprise a general purpose computer selectively activated or reconfigured by a computer program. Such a computer program may be stored in a computer readable storage medium, such as, but not limited to, any type of disk including floppy disks, optical disks, CD-ROMs, magnetic-optical disks, read-only memories (ROMs), random access memories (RAMs), erasable programmable ROMs (EPROMs), electrically erasable programmable ROMs (EEPROMs), magnetic or optical cards.

While the invention has been described in terms of what is presently considered to be the most practical and preferred embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A computer-implemented logging system having a processor, comprising:

means for creating a data view including a plurality of visual data lines;

a record file including a plurality of log records;

an index file including a plurality of entries, wherein each entry corresponds to a respective visual data line in the data view and has a first field and a second field, the first field storing an offset corresponding to a location of a respective log record within the record file and the second field storing an offset corresponding to a location of a portion of data within the respective log record to be reconstructed in the respective visual data line in the data view;

means for appending new log records to the record file and updating the index file;

means for locating a log record corresponding to a respective visual data line according to the first field of a corresponding entry in the index file;

means for retrieving a portion of the data from the corresponding log record according to the second field of the corresponding entry in the index file;

means for interpreting the retrieved data; and means for reconstructing the respective visual data line to be displayed on a log viewing facility using the interpreted data in such a way that the interpreted data is shown continuously side by side on the data view, where the interpreted data for each of the log records occupies zero or at least one of the visual data lines;

wherein each log record is of one of a plurality of record types and each log record includes a header indicating the record type associated with the corresponding log record; the data logging system further comprising a plurality of data controllers, each data controller corresponding to a respective record type; and wherein each of the means for appending new log records and the means for interpreting the retrieved data comprises means for selecting a data controller from the plurality of data controllers according to the record type of the corresponding log record.

2. The data logging system of claim 1, wherein the selected data controller creates zero, one, or a plurality of entries in the index file according to the corresponding log record.

3. The data logging system of claim 1, wherein the selected data controller interprets the data from the log records corresponding to respective target visual data lines.

4. The data logging system of claim 1, wherein the record file and the index file are constructed in such a way that the log record and the data thereof corresponding to a given target visual data line are accessible within essentially constant time regardless of the position of the visual data line within the data view, the size of the data view, the size of the log record, and the size of the record file.

5. A computer-implemented logging method comprising the steps of:

creating a data view including a plurality of visual data lines;

constructing a record file including a plurality of log records;

constructing an index file including a plurality of entries, each entry corresponding to a respective visual data line in the data view and has a first field and a second field, the first field storing an offset corresponding to a location of a respective log record within the record file and the second field storing an offset corresponding to a location of a portion of data within the respective log record to be reconstructed in the respective visual data line in the data view;

appending new log records to the record file and updating the index file;

locating a log record corresponding to a respective visual data line according to the first field of a corresponding entry in the index file;

retrieving a portion of the data from the corresponding log record according to the second field of the corresponding entry in the index file;

interpreting the retrieved data; and displaying the interpreted data in the respective visual data line in the data view in such a way that the interpreted data is shown continuously side by side, where the interpreted data for each of the log records occupies zero or at least one of the visual data line;

wherein each log record is of one of a plurality of record types and each log record includes a header indicating the record type associated with the corresponding log record; the data logging method further comprising a plurality of data controllers, each data controller corresponding to a respective record type; and wherein each of steps of appending new log records and interpreting the retrieved data comprises step selecting a data controller from the plurality of data controllers according to the record type of the corresponding log record.

6. The data logging method of claim 5, wherein the record file and the index file are constructed in such a way that the log record and the data thereof corresponding to a given target visual data line are accessible within essentially constant time independent of the position of the visual data line within the data view, the size of the data view, the size of the log record, and the size of the record file.

7. A computer readable storage medium having a program recorded thereon, wherein the program is adapted for causing a computer processor to perform the steps of:

generating a data view including a plurality of visual data lines;

constructing a record file including a plurality of log records;

constructing an index file including a plurality of entries, each entry corresponding to a respective visual data line in the data view and having a first field and a second field, the first field storing an offset corresponding to a location of a respective log record within the record file and the second field storing an offset corresponding to a location of a portion of data within the respective log record to be reconstructed in the respective visual data line in the data view;

appending new log records to the record file and updating the index file;

locating a log record corresponding to a respective visual data line according to the first field of a corresponding entry in the index file;

retrieving a portion of the data from the corresponding log record according to the second field of the corresponding entry in the index file;

interpreting the retrieved data; and displaying the interpreted data in the respective data line in the data view in such a way that the interpreted date is shown continuously side by side, where the interpreted data for each of the log records occupies zero or at least one of the visual data lines;

wherein each log record is of one of a plurality of record types and each log record includes a header indicating the record type associated with the corresponding log record; the data logging program further comprising a plurality of data controllers, each data controller corresponding to a respective record type; and wherein each steps of appending new log records and interpreting the retrieved data comprises step of selecting a data controller from the plurality of data controllers according to the record type of the corresponding log record.

8. The computer readable storage medium of claim 7, wherein the record file and the index file are constructed in such a way that the log record and the data thereof corresponding to a given target visual data line are accessible within essentially constant time regardless of the position of the visual data line within the data view, the size of the data view, the size of the log record, and the size of the record file.

9. A computer program product embodied in a computer readable storage medium, the computer program comprising a plurality of instructions adapted for causing a computer processor to perform the steps of:

generating a data view including a plurality of visual data lines;

constructing a record file including a plurality of log records;

constructing an index file including a plurality of entries, each entry corresponding to a respective visual data line in the data view and having a first field and a second field, the first field storing an offset corresponding to a location of a respective log record within the record file and the second field storing an offset corresponding to a location of a portion of data within the respective log record to be reconstructed in the respective visual data line in the data view;

appending new log records to the record file and updating the index file;

locating a log record corresponding to a respective visual data line according to the first field of a corresponding entry in the index file;

retrieving a portion of the data from the corresponding log record according to the second field of the corresponding entry in the index file;

interpreting the retrieved data; and displaying the interpreted data in the respective data line in the data view in such a way that the interpreted date is shown continuously side by side, where the interpreted data for each of the log records occupies zero or at least one of the visual data lines;

wherein each log record is of one of a plurality of record types and each log record includes a header indicating the record type associated with the corresponding log record; the data logging program further comprising a plurality of data controllers, each data controller corresponding to a respective record type; and wherein each steps of appending new log records and interpreting the retrieved data comprises step of selecting a data controller from the plurality of data controllers according to the record type of the corresponding log record.

10. The computer program product of claim 9, wherein the record file and the index file are constructed in such a way that the data from the log record and the data thereof corresponding to a given target visual data line are accessible within essentially constant time regardless of the position of the visual data line within the data view, the size of the data view, the size of the log record, and the size of the record file.

* * * * *